United States Patent
Savov

(10) Patent No.: US 7,570,382 B2
(45) Date of Patent: Aug. 4, 2009

(54) SYSTEM AND METHOD FOR DETECTING ERRORS IN ELECTRONIC DOCUMENT WORKFLOW

(75) Inventor: Andrey Savov, Fullerton, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 625 days.

(21) Appl. No.: 11/273,516

(22) Filed: Nov. 14, 2005

(65) Prior Publication Data

US 2007/0112946 A1    May 17, 2007

(51) Int. Cl.
G06F 15/00    (2006.01)
(52) U.S. Cl. .......... 358/1.15; 358/407; 358/402; 358/442; 379/100.01; 379/100.09
(58) Field of Classification Search .......... 358/1.15, 358/407, 440, 405, 402, 442; 379/100.01, 379/100.09
See application file for complete search history.

(56) References Cited

U.S. PATENT DOCUMENTS

| | | | |
|---|---|---|---|
| 4,713,780 A * | 12/1987 | Schultz et al. | 358/1.18 |
| 5,848,248 A | 12/1998 | Kawasaki et al. | |
| 5,918,226 A | 6/1999 | Tarumi et al. | |
| 6,088,126 A * | 7/2000 | Khouri et al. | 358/407 |
| 6,947,943 B2 | 9/2005 | DeAnna et al. | |
| 6,985,938 B2 | 1/2006 | Ohsaki et al. | |
| 7,142,550 B1 * | 11/2006 | Umansky | 358/407 |
| 7,414,744 B2 * | 8/2008 | Barrett et al. | 358/405 |
| 2003/0057143 A1 * | 3/2003 | Lieberman et al. | 209/630 |
| 2005/0028073 A1 | 2/2005 | Henry et al. | |
| 2005/0043982 A1 | 2/2005 | Nguyen | |
| 2005/0108341 A1 | 5/2005 | Mathew et al. | |
| 2005/0114456 A1 | 5/2005 | Mathew et al. | |
| 2005/0114462 A1 | 5/2005 | Mathew et al. | |
| 2005/0134935 A1 | 6/2005 | Schmidtler et al. | |
| 2005/0149908 A1 | 7/2005 | Klianev | |
| 2005/0157330 A1 | 7/2005 | Giuliano | |
| 2005/0172033 A1 | 8/2005 | Mathew et al. | |

FOREIGN PATENT DOCUMENTS

JP    2002-99686    4/2002

* cited by examiner

*Primary Examiner*—Kimberly A Williams
(74) *Attorney, Agent, or Firm*—Tucker Ellis & West LLP

(57) ABSTRACT

A system and method for detecting errors in a document transfer scheme. A user submits an electronic document transfer scheme to the document processing device including document handling instructions. The electronic document transfer scheme is then received by the document processing device and parsed, via the controller, to extract data representative of the destination designated by the scheme. Preferably, the destination data contained in the scheme provides the document processing device with a location to which a copy of an electronic document is to be sent. The source/destination information is then input as an arc on a graph, so as to generate a representation of the workflow associated with the document transfer scheme. A determination is then made, from the graph, whether the submitted electronic document transfer scheme represents at least one cycle on the graph. When it is determined, from an algorithmic query of the graph, that an infinite document transfer scheme exists, a notification is sent to the user submitting the most recent document transfer scheme.

15 Claims, 2 Drawing Sheets

SYSTEM AND METHOD FOR DETECTING ERRORS IN ELECTRONIC DOCUMENT WORKFLOW

BACKGROUND OF THE INVENTION

This invention is directed to a system and method for detecting errors in electronic document transfers. In particular, this invention is directed to a system and method for detecting and preventing infinite or circular workflows within document processing systems or devices.

Document processing devices, such as multifunctional peripheral devices, allow users to setup automatic processing operations to be performed on selected documents or documents transmitted to selected destinations. For example, a first user, User A, may set up an automatic forwarding process to forward any document that is sent to User A's electronic mailbox to the electronic mailbox of a second user, User B. User B may have set up an automatic forwarding process to forward any incoming facsimile that is sent to User B's electronic mailbox to the electronic mailbox of User A and the electronic mailbox of a third user, User C. Therefore, when User B receives a facsimile, pursuant to the automatic forwarding instructions set by User B, the facsimile is transmitted to the electronic mailboxes of User A and User C. Upon receipt of the facsimile for User B in User A's electronic mailbox, pursuant to the automatic forwarding instructions set by User A, the facsimile is sent back to User B's electronic mailbox. When the facsimile is sent back to User B's electronic mailbox, the cycle would begin again and continue ad infinitum. As such, there is a need for a system and method for detecting errors in electronic document transfer schemes.

The subject invention overcomes the above-noted problems and provides a system and method for detecting and preventing infinite or circular workflows in electronic document transfer configurations.

SUMMARY OF THE INVENTION

In accordance with the present invention, there is provided a system and method for electronic document transfers.

Further, in accordance with present invention, there is provided a system and method for detecting and preventing infinite or circular workflows within document processing systems or devices.

Still further, in accordance with the present invention, there is provided a system and method for inspecting electronic document transfer configurations to detect any errors and generating an error message in the event any errors are detected.

Still further, in accordance with the present invention, there is provided a system for detecting errors in electronic document transfers. The system comprises means adapted for receiving setup data representative of a user-selected automated electronic document transfer scheme. The system further comprises testing means adapted for testing the setup data against error data representative of selected error conditions associated with document and means adapted for generating an error signal in accordance with a positive determination of an error condition via the testing means.

Still further, in accordance with the present invention, there is provided a method for detecting errors in electronic document transfers. The method comprises receiving setup data representative of a user-selected automated electronic document transfer scheme. The method further comprises testing the setup data against error data representative of selected error conditions associated with document and upon a positive determination of an error condition, generating an error signal in accordance with a positive determination of an error condition.

Still other objects and aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

This invention is directed to a system and method for detecting errors in electronic document transfers. The system and method of the present invention detect and prevent infinite or circular workflows within document processing systems or devices. The system and method inspects electronic document transfer configurations to detect any errors and generating an error message in the event any errors are detected. In the preferred embodiment of the present invention, reference is made to a document processing device. As used herein, the document processing device is preferably an image generating device, such as a multifunction peripheral device, capable of providing scanning, copying, facsimile, printing, document management, document storage, electronic mail, and other functions to an associated user.

Figure 1:
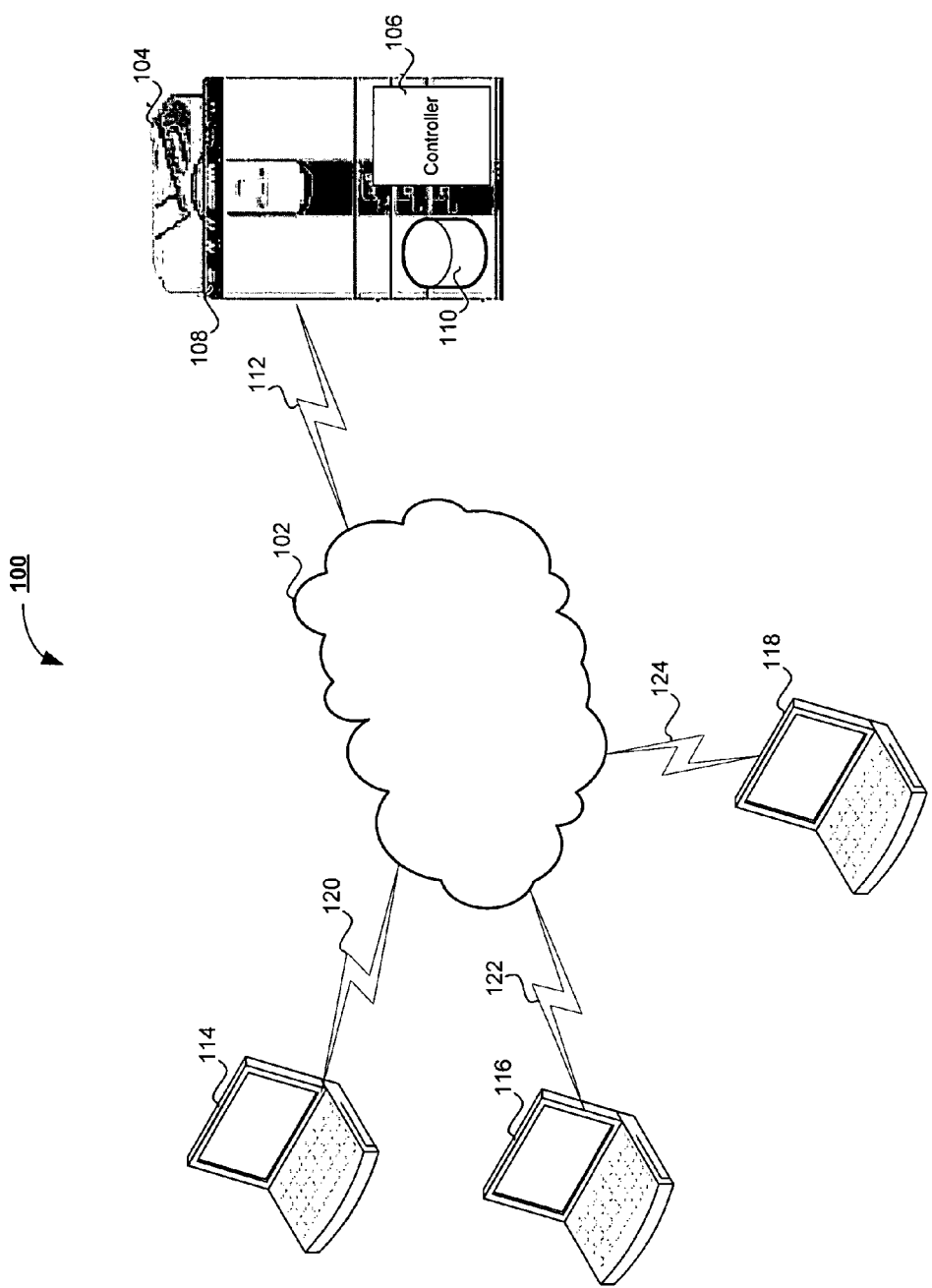
FIG. 1 is a block diagram of the system according to the present invention.

Referring now to FIG. 1, there is depicted a block diagram illustrating a system 100 in accordance with the present invention. As shown in FIG. 1, the system 100 includes a distributed computing environment, illustrated in FIG. 1 as the computer network 102. It will be understood by the skilled artisan that the computer network 102 is any computer network known in the art capable of enabling the communication of data between two or more electronic devices. Suitable computer networks include, for example and without limitation, Ethernet-based, Token Ring-based, local area networks, wide area networks, personal area networks, intranets, the Internet, and the like. In one particular embodiment, the computer network 102 is advantageously capable of employing one or more administratively enabled security protocols, such as user identifications and password combinations, public/private key encryption, certificates, and the like, whereby access to the network 102 and the devices connected thereto is suitably restricted to authorized entities.

The system further includes a document processing device 104, advantageously represented in FIG. 1 as a multifunction peripheral device. It will be appreciated by those skilled in the art that the multifunction peripheral device is suitably adapted to provide a variety of document processing services, such as, for example and without limitation, scanning, copying, facsimile, printing, and the like. Suitable commercially available document processing devices include, but are not limited to, the Toshiba e-Studio Series Controller. Communicatively coupled to the document processing device 104 is a controller 106. It will be appreciated by those skilled in the art that the depiction of the controller 106 as a separate component of the document processing device 104 is for example purposes only and any hardware, software, or combination thereof, integrated with the document processing device 104 is equally capable of functioning as the controller 106.

It will also be understood by those skilled in the art, the controller 106 is suitably adapted to control the functioning of the document processing device 104, provide processing, memory, and other imaging services, and receive user provided instructions, as are known in the art. In the preferred embodiment, the controller 106 is suitably adapted to facilitate the management of document transfer schemes, as set forth by an associated user. The management of document transfer schemes in accordance with the present invention is discussed in greater detail below. The document processing device 104 further includes an associated user-interface 108. In accordance with the preferred embodiment of the present invention, the user-interface 108 is any interactive means of communication between a user and the associated document processing device 104 known in the art, including, without limitation, a touch screen display, an LCD display, an alphanumeric keypad, a function specific tactile input scheme, or any combination thereof. Those skilled in the art will appreciate that an associated user is advantageously able to directly interact with the document processing device 104 via the associated user-interface 108.

The document processing device 104 further includes a data storage 110, suitably adapted to retain electronic file and document management information, routing data, graphs, and the like. It will be understood by those skilled in the art that the data storage 110 is any data storage device known in the art, including, without limitation, flash memory, magnetic data storage, optical data storage and the like. In accordance with a preferred embodiment of the present invention, the data storage 110 further includes data representative of user-defined electronic document transfer schemes. Preferably, the data storage 110 is operatively coupled to the controller 106, so as to enable the controller 106 to control the transfer of electronic document data in accordance with the document transfer schemes stored thereon. The document processing device 104 is communicatively coupled to the computer network 102 via a suitably communications link 112. Preferably, the communications link 112 is any communication channel known in the art capable of carrying data communications between two or more electronic devices. Suitable communications links include, but are not limited to, the public-switched telephone system, the Internet, local area networks, wide area networks, personal area networks, WiMax, and the like.

In addition, the system 100 of FIG. 1 includes one or more associated users, illustrated in FIG. 1 as the user devices 114, 116, and 118. Preferably, the user devices 114, 116, and 118 are in data communication with the computer network 102 via respective communications links 120, 122, and 124. It will be appreciated by the skilled artisan that the user devices 114, 116, and 118 are any suitable electronic devices known in the art capable of connecting to the computer network 102 and the other electronic devices connected thereto. Although illustrated in FIG. 1 as a laptop computer, those skilled in the art will understand that such a representation of the user devices 114, 116, and 118 is for illustration purposes only, and any other suitable electronic devices are equally capable of being employed in accordance with the present invention. Thus, for example and without limitation, suitable user devices include desktop computers, a smart phone, a cellular-based personal electronic device, a web-based personal electronic device, and the like. It will further be understood by those skilled in the art, the communication links 120, 122, and 124 are any suitable channel for communication between electronic devices known in the art, including, without limitation, wired communications links, wireless communications links, such as WiMax, 802.11(x), infrared, and the like. The skilled artisan will appreciate that the type of communications links 120, 122, and 124 employed by the user devices 114, 116, and 118 are dependent upon the communications capabilities of the user devices 114, 116, and 118 and the computer network 102.

For purposes of example only, the system 100 of FIG. 1 is illustrated using the user devices 114, 116, and 118, however the skilled artisan will appreciate that such an illustration is representative of one or more associated users. Thus, in accordance with the present invention, an associated user is able to access the document processing device 104 via the user-interface 108, the user device 114, the user device 116, and the user device 118. In operation, a user, via user device 114, submits an electronic document transfer scheme to the document processing device 104 via any suitable means known in the art. It will be appreciated by those skilled in the art that the user device 114 is capable of employing a web-based access portal to connect to the document processing device 104 when remotely located relative to the network 102 of the system 110. In the preferred embodiment, however, the network 102 is a local area network, to which the document processing device 104 and the user devices 114-118 are communicatively coupled. Preferably, the electronic document transfer scheme submitted to the document processing device 104 includes document handling instructions. As will be appreciated by those skilled in the art, suitable document handling instructions include, but are not limited to, forwarding documents, storing documents, securely storing documents, outputting documents, electronic mail message attachment forwarding, facsimile transmission and the like. For example, a suitable electronic document transfer scheme includes instructions to forward a copy of all documents destined for the user of device 116 to the user of device 114 and the user of device 118.

The electronic document transfer scheme is then received by the document processing device 104 and parsed, via the controller 106, to extract data representative of the destination designated by the scheme. It will be understood by those skilled in the art that the destination, as referenced herein, refers to one of a user, a user device, an electronic mail address, a facsimile number, or the like. Preferably, the destination data contained in the scheme provides the document processing device with a location to which a copy of an electronic document is to be sent. More preferably, the document transfer scheme further includes parameters representative of which electronic documents are to be subjected to the document processing scheme and which documents will not undergo further transmission. For example, the present invention is capable of implementing a document transfer scheme whereby documents sent to facsimile number A will also be sent to facsimile number B, but documents sent to facsimile number C will not be sent to any additional locations. Alternatively, documents sent to the document processing device 104 from the user device 118 will be forwarded on to the user device 114, but documents sent to the document processing device 104 by the user device 116 will not be forwarded to any additional user devices. The skilled artisan will appreciate that the transmission parameters are determined by the author of the electronic document transfer scheme.

Following parsing of the electronic document transfer scheme and determination of the destination of any copies, the source/destination information is input as an arc on a graph by the controller 106, so as to generate a representation of the workflow associated with the document transfer scheme. Preferably, the graph is stored in the associated data storage 110, thereby allowing the controller 106 to retrieve the graph as needed, i.e., upon receipt of a new or modified electronic document transfer scheme. The controller 106 then determines, from the graph, whether the submitted electronic document transfer scheme represents at least one cycle on the graph, that is, when a cycle is present on the graph, the controller 106 has determined that the submitted transfer scheme is infinite, i.e., an electronic document is capable of being routed from one user to another user and back again an infinite number of times. For example, when user device 114 sets forth that all facsimiles sent to user 114 are also to be forwarded to user device 116, and user device 116 has submitted that any incoming facsimiles user 116 receives are to be forwarded to user device 114, an infinite loop of document transfers exists. In accordance with the present invention, the subject method prevents such a transfer by determining, at the time of submission of a document transfer scheme, whether the potential for infinite transfers exists. When the controller 106 determines, from an algorithmic query of the graph, that an infinite workflow, i.e., infinite document transfer scheme, is possible, a notification is sent to the user submitting the most recent, i.e., conflicting, document transfer scheme. Upon such notification, the user is able to alternatively cancel the transfer scheme, or insert additional parameters, whereby the document is limited in the number of transfers, or is to exclude forwarding when the sender is the recipient. Those skilled in the art will appreciate that other means of restricting infinite workflows in accordance with the present invention are capable of implementation following the detection of the possibility by the instant invention.

Figure 2:
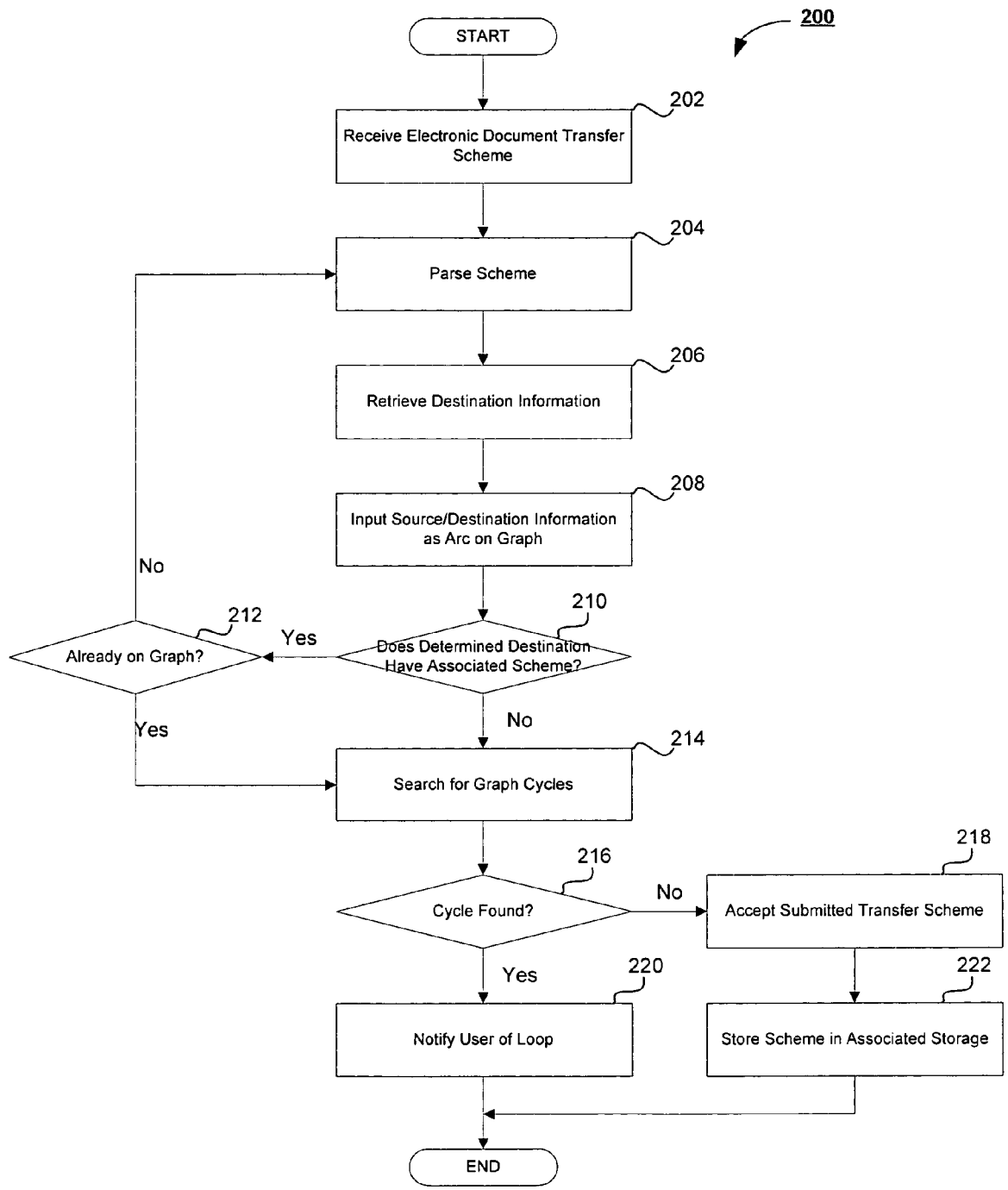
FIG. 2 is a flowchart illustrating a method for detecting errors in electronic document transfers in accordance with the present invention.

Turning now to FIG. 2, there is shown a flowchart 200 illustrating a method for determining infinite workflows in accordance with the present invention. As shown in FIG. 2, the method begins at step 202, wherein the controller 106 receives an electronic document transfer scheme from an associated user. Thus, for purposes of example, the user device 114 transmits a desired electronic document transfer scheme to the document processing device 104 at step 202. At step 204, the controller 106 parses the received electronic document transfer scheme for destination information, which is retrieved at step 206. In accordance with this example, the document transfer scheme requires that the document processing device 104 forward any received facsimiles designating the user 114 as the recipient on to the user 116 and the user 118.

The controller 106 then inputs the source information (user 114) and the destination data (users 116 and 118) as an arc on a graph. At step 210, a determination is made whether the designated destinations, e.g., users 116 and 118, have any associated electronic transfer schemes. It will be appreciated by those skilled in the art that the determination is based upon schemes stored in the associated storage 110, communicatively coupled to the controller 106. When no additional schemes are located at step 210, flow proceeds to step 214, wherein a search is made on the graph for cycles. It will be understood by those skilled in the art that a cycle is a loop that an electronic document makes between two or more users, resulting in the sending user also being designated as the recipient. Thus, when user 114 is the sending user, i.e., initiates the forwarding of the received facsimile, and is also a designated recipient, i.e., receives the facsimile again as a result of a transfer scheme, a cycle is said to exist. When a cycle is determined to exist at step 216, the user, e.g., user 114, is notified of the potential infinite workflow at step 220 and the submitted transfer scheme is rejected. When no cycle is found at step 216, flow proceeds to step 218, whereupon the submitted electronic document transfer scheme is accepted by the controller 106 and stored with other schemes in the associated data storage 110 at step 222.

Returning to step 210, when it is determined that a designated destination has an associated transfer scheme, the scheme is retrieved from the associated data storage 110 and a determination is made at step 212 whether the retrieved schemes are already present on the graph. When the retrieved schemes are present on the graph, flow proceeds to step 214, for further processing. When the retrieved schemes are not present on the graph, flow returns to step 204, whereupon the retrieved schemes are parsed for destination information. Thus, in accordance with the foregoing example, when user 116, user 118, or both have associated electronic document transfer schemes associated therewith, flow returns to step 204 for further processing. For explanation purposes, user 116 has a facsimile based transfer scheme, whereas user 118 has an electronic mail message based transfer scheme. Both schemes are retrieved, parsed at step 204, and destinations regarding the schemes are determined at step 206. The destinations are then input on the same graph as the user 114 submitted scheme at step 208, and processing flows from thereon to step 210, wherein a determination is made whether the destinations have transfer schemes. When the destinations have transfer schemes, flow proceeds to step 212, wherein a determination is made whether the transfer schemes associated with the destinations have already been incorporated onto the graph. When a negative determination results at step 212, flow returns to step 204 for further processing. When a positive determination is made at step 212, flow proceeds to step 214, wherein a search is conducted on the graph for any cycles related to the submitted transfer scheme.

Continuing with the example above, the retrieved scheme associated with user 116 indicates that any received facsimiles are to be forwarded to user 114, and the retrieved electronic message scheme associated with user 118 indicates that any received messages are to be forwarded to users 116 and 114. It will be understood by those skilled in the art that the electronic mail scheme will not indicate an infinite loop, as the submitted scheme references only facsimile documents and not electronic mail. Thus, at step 214, a search is conducted of the graph for any cycles. The skilled artisan will appreciate that any suitable graph theory algorithm known in the art capable of determining the presence of cycles on the graph is capable of being implemented in accordance with the present invention. The retrieved scheme associated with user 116 and the submitted scheme both stipulate the forwarding of facsimile documents. Accordingly, as the scheme associated with user 116 and already present in the data storage 110 indicates the forwarding of received facsimile documents to user 114 and the submitted user 114 scheme requires the forwarding of facsimile documents to user 116, an infinite loop has the potential of arising should both schemes be allowed. Therefore, the controller 106 notifies the user 114 of the potential of an infinite loop arising and requires the user 114 to submit an alternate scheme or additional parameters, thereby preventing an infinite routing to occur.

Those skilled in the art will appreciate, however, if the scheme associated with user 116 does not indicate that received facsimile documents be forwarded to user 114, no cycle will be found on the graph. Accordingly, the submitted scheme would be deemed acceptable, and the scheme would be stored in the associated data storage 110 for further processing. The skilled artisan will further appreciate that the stored schemes are readily accessible by the controller 106 and continually used to coordinate the transmission of electronic documents received by the document processing device 104, or documents originating with the document processing device 104.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. An error detection system for electronic document transfers comprising:
    means adapted for receiving setup data representative of a user-selected automated electronic document transfer scheme;
    testing means adapted for testing the setup data against error data representative of selected error conditions associated with document, wherein the setup data includes forwarding data representative of instructions to automatically forward electronic documents to at least one selected destination;
    the testing means further comprises graph generating means adapted for generating graph data representative of interrelationships between selected destinations as specified in the forwarding data; and
    means adapted for generating an error signal in accordance with a positive determination of an error condition via the testing means.

2. The error detection system for electronic document transfers of claim 1 wherein the forwarding data includes data representative of routing at least one electronic document to at least one of a facsimile, electronic mail, storage, a printing device, and a scanning device.

3. The error detection system for electronic document transfers of claim 1 wherein the error data includes loop data representative of bidirectional forwarding of electronic documents between at least two destinations.

4. The error detection system for electronic document transfers of claim 1 wherein the testing means further comprises means adapted for determining if the graph data comprises at least one cycle.

5. The error detection system for electronic document transfers of claim 4 wherein an error signal is generated upon a positive determination that the graph data comprises at least one cycle.

6. A method for detecting errors in electronic document transfers comprising the steps of:
    receiving setup data representative of a user-selected automated electronic document transfer scheme;
    testing the setup data against error data representative of selected error conditions associated with document, wherein the setup data includes forwarding data representative of instructions to automatically forward electronic documents to at least one selected destination;
    generating graph data representative of interrelationships between selected destinations as specified in the forwarding data; and
    upon a positive determination of an error condition, generating an error signal in accordance with a positive determination of an error condition.

7. The method for detecting errors in electronic document transfers of claim 6 wherein the forwarding data includes data representative of routing at least one electronic document to at least one of a facsimile, electronic mail, storage, a printing device, and a scanning device.

8. The method for detecting errors in electronic document transfers of claim 6 wherein the error data includes loop data representative of bidirectional forwarding of electronic documents between at least two destinations.

9. The method for detecting errors in electronic document transfers of claim 6 wherein the step of testing the setup data further comprises the step of determining if the graph data comprises at least one cycle.

10. The method for detecting errors electronic document transfers of claim 9 wherein an error signal is generated upon a positive determination that the graph data comprises at least one cycle.

11. A computer-readable medium with computer-readable instructions stored thereon for detecting errors in electronic document transfers comprising the steps of:
    instructions for receiving setup data representative of a user-selected automated electronic document transfer scheme;
    instructions for testing the setup data against error data representative of selected error conditions associated with document, wherein the setup data includes forwarding data representative of instructions to automatically forward electronic documents to at least one selected destination;
    instructions for generating graph data representative of interrelationships between selected destinations as specified in the forwarding data; and
    upon a positive determination of an error condition, instructions for generating an error signal in accordance with a positive determination of an error condition.

12. The computer-readable medium with computer-readable instructions stored thereon for detecting errors in electronic document transfers of claim 11 wherein the error data includes loop data representative of bidirectional forwarding of electronic documents between at least two destinations.

13. A computer-implemented method for detecting errors in electronic document transfers comprising the steps of:
   receiving setup data representative of a user-selected automated electronic document transfer scheme;
   testing the setup data against error data representative of selected error conditions associated with document, wherein the setup data includes forwarding data representative of instructions to automatically forward electronic documents to at least one selected destination;
   generating graph data representative of interrelationships between selected destinations as specified in the forwarding data; and
   upon a positive determination of an error condition, generating an error signal in accordance with a positive determination of an error condition.

14. The computer-implemented method for detecting errors in electronic document transfers of claim 13 wherein the forwarding data includes data representative of routing at least one electronic document to at least one of a facsimile, electronic mail, storage, a printing device, and a scanning device.

15. The method for detecting errors in electronic document transfers of claim 13 wherein the error data includes loop data representative of bidirectional forwarding of electronic documents between at least two destinations.

* * * * *